(12) United States Patent
Valley et al.

(10) Patent No.: US 7,567,266 B2
(45) Date of Patent: Jul. 28, 2009

(54) MEDIA LABELING SYSTEM

(75) Inventors: Jeffrey M Valley, Corvallis, OR (US);
Paul J McClellan, Bend, OR (US);
Timothy F. Myers, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 10/836,866

(22) Filed: Apr. 30, 2004

(65) Prior Publication Data
US 2006/0026622 A1 Feb. 2, 2006

(51) Int. Cl.
*B41J 2/435* (2006.01)
(52) U.S. Cl. ....................................... 347/224
(58) Field of Classification Search ......... 347/224–225, 347/229; 369/47.51, 47.52, 53.37, 100, 125, 369/275.3, 116; 358/1.5
See application file for complete search history.

(56) References Cited

U.S. PATENT DOCUMENTS

| | | | |
|---|---|---|---|
| 5,181,081 A | 1/1993 | Suhan | |
| 5,316,464 A | 5/1994 | Lexell | |
| 5,518,325 A | 5/1996 | Kahle | |
| 5,553,044 A * | 9/1996 | Tanaka | 369/47.52 |
| 5,781,221 A | 7/1998 | Wen et al. | |
| 5,915,858 A | 6/1999 | Wen | |
| 6,074,031 A | 6/2000 | Kahle | |
| 6,270,176 B1 | 8/2001 | Kahle | |
| 6,295,262 B1 * | 9/2001 | Kusumoto et al. | 369/53.37 |
| 6,532,034 B2 * | 3/2003 | Hirotsune et al. | 347/229 |
| 7,082,094 B2 * | 7/2006 | Morishima et al. | 369/116 |
| 7,161,881 B2 * | 1/2007 | Pereira | 369/47.51 |
| 2002/0191517 A1 | 12/2002 | Honda et al. | |
| 2004/0095877 A1 * | 5/2004 | Osakabe | 369/125 |
| 2005/0078324 A1 * | 4/2005 | Koll et al. | 358/1.5 |
| 2005/0147019 A1 * | 7/2005 | Creel et al. | 369/275.3 |
| 2006/0087949 A1 * | 4/2006 | Lambert et al. | 369/100 |

FOREIGN PATENT DOCUMENTS

| | | |
|---|---|---|
| EP | 0469727 | 2/1992 |
| EP | 1274084 | 1/2003 |
| EP | 1625582 | 11/2005 |
| JP | 0416227 | 6/1992 |

OTHER PUBLICATIONS

Search Report for Malaysia Patent Application No. PI-2004-4021; filed Sep. 30, 2004. Report issued Sep. 24, 2008.

* cited by examiner

*Primary Examiner*—Hai C Pham

(57) ABSTRACT

Media identification control features are read on media. Settings are applied to a label writer based on the media identification control features. A label is generated on the media based on the settings.

50 Claims, 3 Drawing Sheets

MEDIA LABELING SYSTEM

BACKGROUND

Recording devices for recording digital information on media, such as discs, have been recently provided with the ability to generate labels on the disc. Such discs may be optical discs, CDs, DVDs or other suitable recording media. The label may contain a description of the information recorded on the disc, such as song titles or the name of the recorded music selection, along with graphical elements or background. The recorded information is recorded on a first side of the disc otherwise known as the data side of the disc, while the label is typically applied to the second side of the disc, otherwise known as the label side of the disc. The label is generated by recording the text and graphic elements into the label side of the disc commonly with the same laser device that records the information into the data side of the disc.

The label material used to fabricate discs may vary from manufacturer to manufacturer, and sometimes even from disc type to disc type from the same manufacturer. This variation in materials may affect the manner in which the label is generated and the appearance of the generated label. For example, discs constructed of one material may appear darker when labeled, while discs constructed of another material may appear lighter when creating the label on the disc. Other parameters may also vary from disc to disc. The present invention was developed in light of these and other characteristics of the media.

BRIEF DESCRIPTION OF THE DRAWINGS

The present invention will now be described, by way of example, with reference to the accompanying drawings, in which.

DETAILED DESCRIPTION OF AN EMBODIMENT

The present embodiments provide media identification control features on one or more sides of recording media, such as a disc, which contain information that assists a label writer in applying a label to the disc. The media identification control features are read by the label writer and used to determine proper and suitable settings or parameters for applying the label to the disc. The media identification control features can include information such as: safety parameters for safely applying the label to the disc; marking parameters which may include minimum and maximum laser power settings; marking speeds; other features needed for creating the label, quality parameters that include information for enhancing the visual quality of the label; and other fields for advantageously creating the label. By utilizing this information, labels may be suitably applied to different discs having different properties or materials. Although this description describes the recording media as being an exemplary disc, other forms of recording media embodiments, such as memory cards, magnetic cards, and imageable material (e.g. photographs), to name a few, can implement the invention and still fall within the scope of the claims. A label can include text, graphics, or combinations of text and graphical information.

Figure 1:
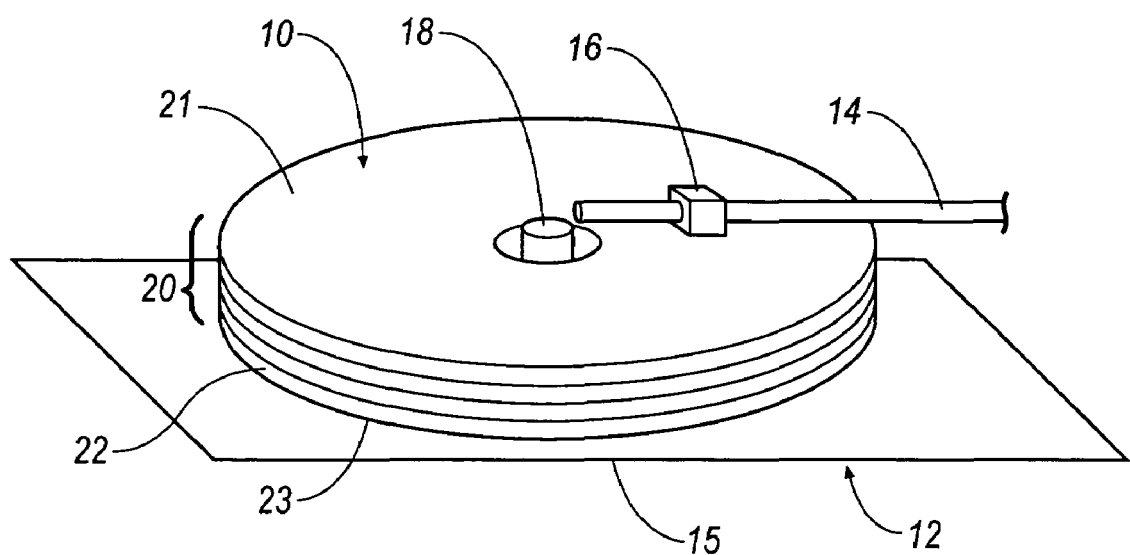
FIG. 1 is a perspective view of a label writer according to an embodiment.

Referring now to FIG. 1, an exemplary disc 10 is shown being used in conjunction with a label writer 12. The disc 10 can be an optical disc such as a CD, DVD or other suitable recording medium. The disc 10 has a label side 21 on which may be recorded a label having information representing the data recorded on the disc 10, pictures or drawings, or any other suitable label content desired to be placed thereon by a user of the label writer 12. The label is a visible image generated on the disc by the label writer as the laser irradiates specified portions of the labeling material.

The label side includes a material that is responsive to laser light for forming the label on the disc 10. The disc 10 also includes a data side 23 for digitally recording information or material. This information or material recorded on the data side 23 of disc 10 can include any information such as music, computer information, video information, other digital information, or any other suitable information for being recorded on the disc 10. The label and data may alternatively be formed on the same side of the recording medium.

The label writer 12 includes a spindle driver 18 adapted to drive the disc 10 in a rotational manner with respect to platform 15. An optical reader such as a laser mechanism which may include a laser/photodetector 16 is attached to a track 14 to allow the laser/photodetector 16 to move along the track 14 for reading and writing information to and from disc 10, as will be readily understood by one skilled in the art. To accomplish reading and writing, laser/photodetector 16 includes a laser portion and a photodetector portion. The laser portion can be a single laser for use in reading and writing information to and from disc 10; or there can be separate lasers, one for reading information from the disc 10 and the other for writing information to disc 10. The laser portion can also include a separate laser for generating the label. One skilled in the art will readily recognize variations to the described embodiments.

The photodetector portion reads laser light reflected from the disc 10 that is initially projected onto the disc 10 by the laser portion. When reading, the laser shines light onto the surface of the disc 10 and reads the light reflected therefrom by the photodetector portion. When writing, as will be described in greater detail, the laser impinges the surface of the disc 10 with sufficient laser light to cause optical variations in the disc 10. One skilled in the art will readily recognize variations in the disclosed embodiment for reading and writing information to and from the disc 10.

Figure 2:
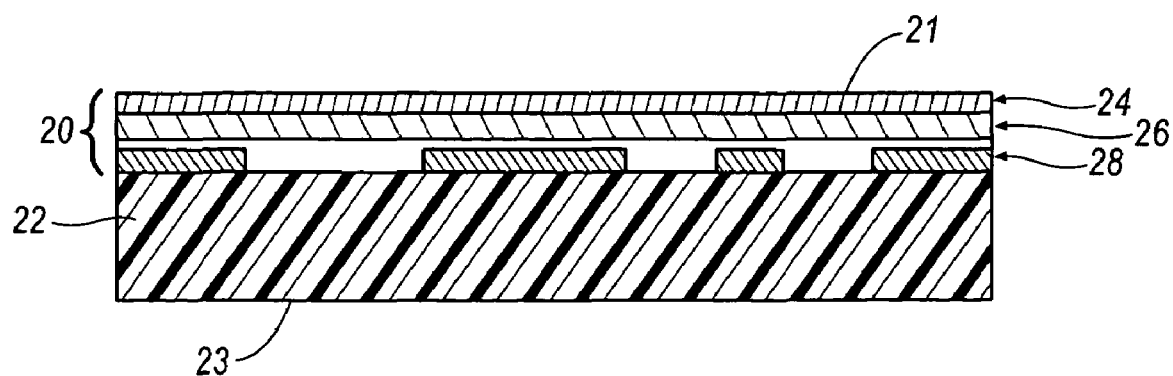
FIG. 2 is a side, cross-sectional view of a media according to an embodiment.

To record information on the data side 23, referred to as "writing" data, and to create a label on label side 21, also referred to as "labeling", the disc 10 includes an information area 20 that is adapted to store optical variations generated by the laser/photodetector 16. The information area 20 includes a plurality of layers that assist in creating the label on label side 21 and recording the information on data side 23. Referring to FIG. 2, the exemplary layers as described above are shown in greater detail. The layers of the information area 20 may include labeling material 24, reflective material 26, and dye 28. The information area may also be implemented by using embossed marking in the media.

The label 24 is constructed of material that reacts with light to form colors or other optical variations detectable by the human visual system in response to laser light from laser 16.

Such optical variations may be color differences, grey scale differences, black and white variations or any other variations detectable by the human visual system. By this way, laser light from laser 16 can be projected onto the label 24 at certain locations to form the desired text or pictures on the label.

Reflective material 26 can be any reflective material such as aluminum which reflects laser light projected thereon. The reflective material 26 serves to optically separate the label 24 and the dye 28. Additionally, the reflective material 26 serves to reflect light from data side 23 when dye 28 is clear for reasons that will be described.

Dye 28 is made of a material that becomes dark in response to laser light while being clear when unexposed to laser light. By this way, laser light can be projected onto the dye 28 to form a series of dark and clear spots or data pattern for encoding digital information in the dye 28. Of course, one skilled in the art will readily understand that any optical variations that allow encoding may be used. For example, the dye 28 can be normally dark, while laser light causes it to become clear.

Substrate 22 is constructed of a clear material such as polycarbonate plastic to allow laser light to pass through and to form dark and clear spots in dye 28 for recording digital information. As will be described, light is projected through substrate 22 from data side 23 to impinge on the dye 28. As will be readily understood by one skilled in the art, by forming a data pattern with dye 28, a digital signature may be encoded in the data side 23 by virtue of the reflective and non-reflective portions resulting from dye 28 and reflective material 26.

Figure 3:
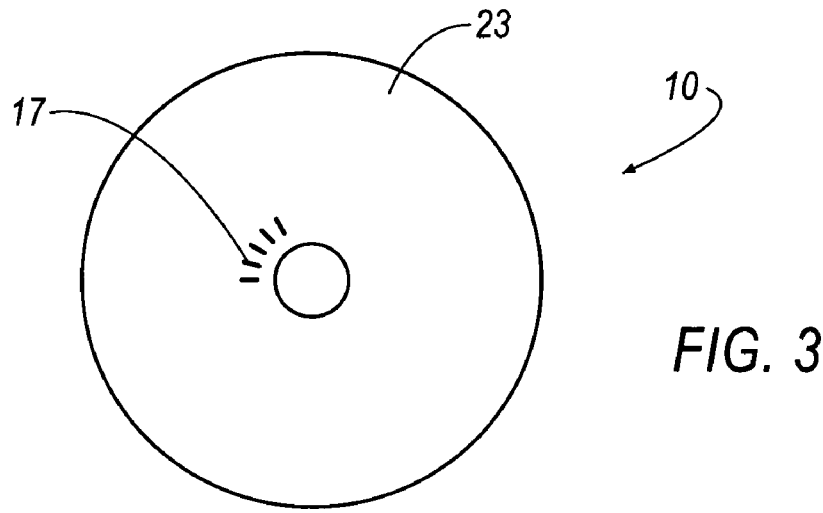
FIG. 3 is a plan view of a media according to an embodiment.

As shown in FIG. 3, the disc 10 includes media identification control features 17. By way of example, the media identification control features 17 are shown as being disposed on the data side 23. The media identification control features are a pattern of encoded information that represents settings readable by the label writer 12 and usable for generating the label on the label side 21. As will be discussed in more detail below, the settings allow the label writer 12 to establish appropriate or optimal settings for various components of the label writer for properly applying a label to the disc 10. Although the media identification control features 17 are shown on the data side 23, in another embodiment the media identification control features 17 can be positioned on the label side 21 or any other side that can be read by label writer 12. In one embodiment, the media identification control features 17 are positioned along the hub portion of the disc 10 on the data side 23. However, in an alternate embodiment, the media identification control features 17 may be positioned on other locations along the data side 23 or label side 21 of the disc 10 such as along the outer rim of the disc. In yet another embodiment, the media identification control features 17 may be located on one side of the disc 10 but still be readable from the other side of the disc 10. For instance, the media identification control features 17 may be located on the label side 21 of the disc 10 but still may be readable by the laser/photodetector 16 when the data side 23 of the disc 10 is presented to the laser/photodetector 16.

Figure 4:
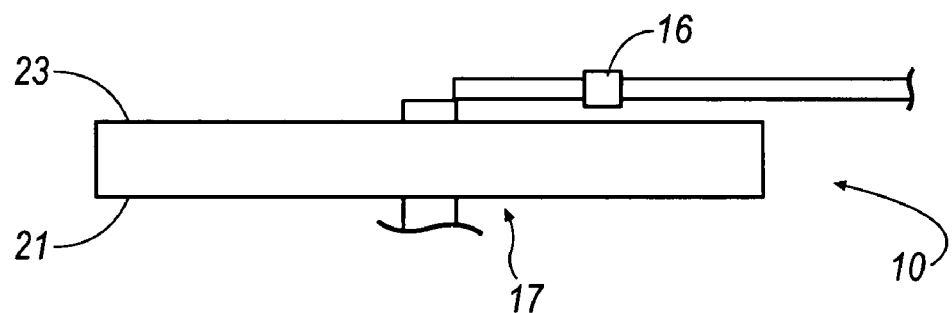
FIG. 4 is a side view of a label writer according to an embodiment.
Figure 5:
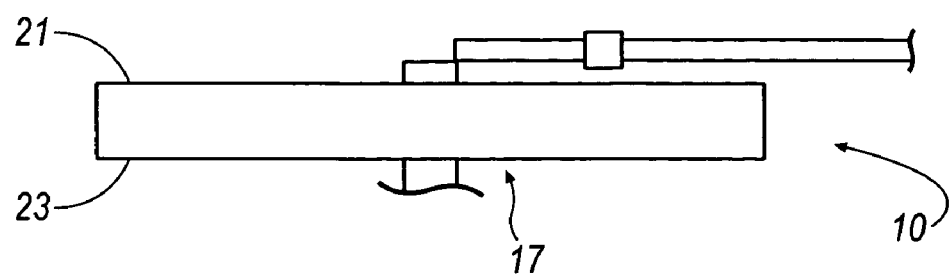
FIG. 5 is a side view of a label writer according to an embodiment.

With reference to FIGS. 4 and 5, the operation of the present invention will be described in greater detail. The operation begins by positioning the disc 10 in the label writer 12 such that the media identification control features may be read by the laser/photodetector 16. Accordingly, with reference to FIG. 4, the operation of one embodiment of the present invention starts by positioning the disc 10 in the label writer 12, such that the media identification control features 17 (in this example shown on data side 23) face the laser/photodetector 16. The laser/photodetector 16 detects and decodes the media identification control features 17 and provides the decoded the information, otherwise referred to as settings, to the label writer 12. In an embodiment, the label writer 12 also encodes data in the dye 28 before or after this step so as to write digital data to the disc 10. By this way, both the digital data writing process and the reading of media identification control features 17 are accomplished without having to initiate separate processes or reposition the disc 10 in the label writer 12. By not having to reposition the disc, the disc does not need to be removed, inverted or reinserted in order to execute the steps of writing digital data and reading of media identification control features 17. More specifically, no physical movement or interaction, outside the normal rotational action of the disc, need be effectuated to perform both of these operations.

The laser/photodetector 16 reads the media identification control features 17 by projecting laser light onto the media identification control features 17 and detecting reflected light therefrom with the photodetector portion of the laser/photodetector 16. Drive firmware or a host system in the label writer 12 then decodes the detected media control feature signal to obtain the settings.

The settings encoded in the media identification control features 17 can include information such as safety parameters for safely applying the label to the disc, marking parameters which include minimum and maximum laser power settings, marking speed, and other features desired for creating the label, quality parameters that include information for enhancing the visual quality of the label, and other fields for advantageously creating the label. By this way, labels may be applied to discs having different settings or parameter demands. By safely applying the label to the disc, protection of the disc is ensured. Specifically, for example, if a too strong of a laser setting is used to generate the label, the high energy from the label may cause damage to the disc. In an extreme condition, a strong laser setting may penetrate to the data side of the disc and destroy data. It is also possible to damage the surface of the disc or cause the disc to warp if an improper laser setting is used. One can readily see that depending on the settings used for applying a label, the disc itself may be damaged. Specific descriptions of the media identification control features 17 and the information encoded therein will be described in greater detail hereinafter.

In the example provided, once the media identification control features 17 have been read into the label writer 12, the disc 10 is repositioned in the label writer 12 as shown in FIG. 5, such that the label side 21 faces the laser/photodetector 16. If the media identification control features 17 are on the label side 21, however, then the disc 10 does not need to be repositioned in the label writer 12. The laser/photodetector 16 then creates the label by projecting appropriate laser light onto the label 24 to adjust the optical configuration of label 24 to create a visual label.

Figure 6:
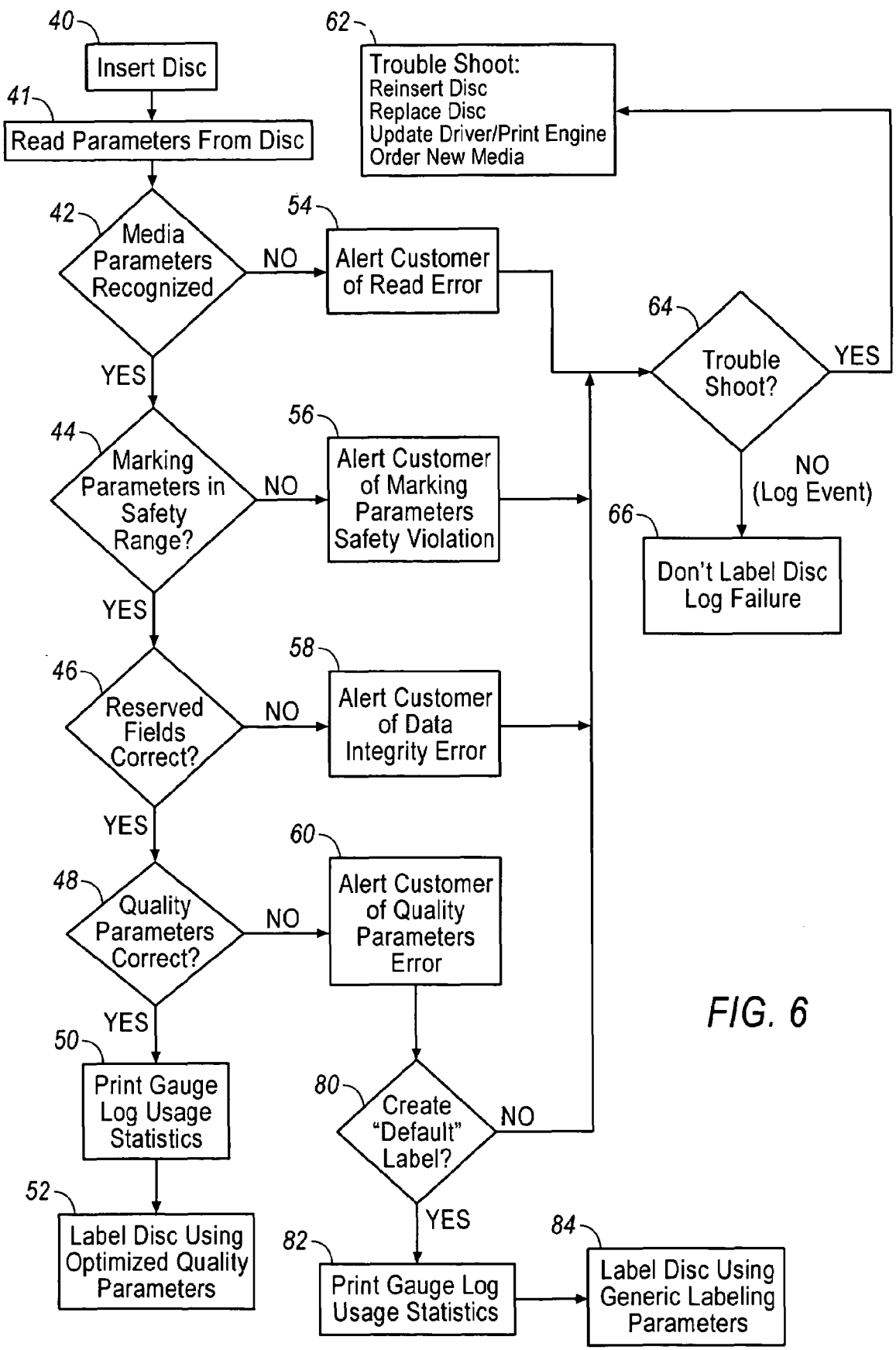
FIG. 6 is a flowchart for the operation of a label writer according to an embodiment.

Referring now to FIG. 6, an embodiment for processing the settings decoded from the media identification control features 17 to facilitate the generation of a label by label writer 12 is described in greater detail. FIG. 6 illustrates a flowchart for use in one embodiment by the drive firmware or host system in the label writer 12 for adjusting features such as the spin speed of the disc 10 and the power of the laser in response to reading the media identification control features.

In step 40, the disc 10 is inserted into the label writer 12 as shown in FIG. 4. Next, in step 41, media identification parameters are determined from the label writer 12. The media identification parameters are settings that include information such as the media identification data structure and available parameters. The media identification data structure includes information such as the version number of the label writer software that is to be used to label the disc 10disc. For example, the media identification parameters may include information that the disc 10 is for use with label writer software of version 1. This indicates that the software on the label writer 12 will interpret the media parameters according to structure version 1. The label writer software uses the version number to interpret the data encoded within the media identification parameters. As new media types may require additional or different media identification parameters, a new version number is assigned to a new disc 10 having a different structure from a previous version. If the software of the label writer 12 understands the structure layout for the disc 10, it can thereby decode the settings encoded therein. Otherwise, the label writer software may need to be updated to support the new media type. If the label writer software understands the structure layout and decodes the settings, then the label writer 12 will have all of the most current information available for that particular disk 10. The label writer 12 also has the most current index tables, which will be described in greater detail.

The label writer 12 does not necessarily need to read the version number in order to interpret the media parameters. Instead, the label writer 12 could simply attempt to read the media parameters, and if it could not, then the label writer 12 could be prompted to require an updated version of the software that is used to interpret the media parameters. However, by reading the version number first, label writer 12 is able to determine whether it is able to understand the media parameters before any attempt is made to read the media parameters.

The media parameters may include either the specific settings or may include an index that links to prestored values of settings in the software on the label writer 12. By indexing to the prestored settings, instead of reading the settings from the media identification control features 17, the specific media parameters do not need to be stored in the media identification control features 17. Instead, this information can be stored in the label writer 12 and addressed or indexed in the media parameters to the correct locations in the table stored in the label writer 12 to achieve the correct settings.

If at step 42 the media identification parameters are not recognized by the label writer 12, then step 54 is executed and the customer or user of the label writer 12 is alerted to the fact that the version or media identification parameters are not recognized. The reason that the media identification parameters are not recognized may be due to the disc 10 being more recent in production than the label writer 12. For example, the disc 10 may have media identification data structure version 2, while the label writer 12 software only understands earlier media identification data structure version 1. In this situation, the label writer 12 may be required to obtain an update in its software, such that it understands the current media identification data structure version for writing to the disc 10, corresponding to the version number read from the media identification control features 17. This can be done in conjunction with the trouble shooting routine described below.

The troubleshooting procedure may be executed to attempt to resolve the problem of the label writer software not understanding the version of the disc 10. Specifically, an option may be put forth to a user, such as through step 64, to execute a troubleshooting procedure. If the option is selected, then step 62 is executed to attempt to resolve the problem. Many approaches for troubleshooting may be employed such as the elements disclosed in block 62 of requesting the user to reinsert the disc 10 into the label writer 12, replacing the disc 10 with a different disc 10, updating the driver or print engine in the label writer 12 to a more recent version, or ordering alternate media for the label writer 12. If the troubleshooting routine 64 is not selected, then step 66 is executed and the process ends. This ending may also be logged or recorded in the label writer 12. If the media identification structure cannot be read, then no attempt will be made to label the disc 10 with even default values. This avoids the possibility of damaging the data side of the disc either by writing directly on the data side through the label side such as, by applying laser light at too high a marking laser power setting or too slow a marking speed. Likewise, if the troubleshooting routine 64 does not solve the problem, then block 66 is executed and the disc is not labeled.

If the media parameters are properly read and understood by the label writer 12, then step 44 is executed. In step 44, the marking parameters, which are settings used to mark the label on the label side 21 of the disc 10, are used to adjust the parameters of the label writer 12. The marking parameters may include either the specific settings or may include an index that links to prestored values of settings in the software on the label writer 12. By indexing to the prestored settings, instead of reading the settings from the media identification control features 17, the specific media parameters do not need to be stored in the media identification control features 17. Instead, this information can be stored in the label writer 12 and addressed or indexed in the marking parameters to the correct locations in the table stored in the label writer 12 to achieve the correct settings.

The marking parameters include acceptable parameters, or acceptable ranges of parameters, for properly marking the media. Such acceptable parameters or acceptable ranges of parameters ensure that the media is not damaged, or that a certain minimum quality level of marking is effected. For example, the marking parameters may include the recommended laser power and the write speed. The laser power specifies the power required by the media to generate a label that has an acceptable optical density. For example, in one embodiment, the power range provided by the marking parameters is between 45 and 120 milliwatts. Likewise, the write speed might be expressed in any units such as centimeters per second. For example, in one embodiment, a safe range for the write speed may be expressed as between 1 and 256 cm/second. An alternative embodiment may specify a range of recommended laser power and write speed settings to allow greater flexibility for the label writer 12. For example, a specific range may be identified that the label writer 12 may use with a minimal impact on quality. Thus, instead of merely selecting ranges that ensure that no damage is done to a particular disc, the range may be selected such that by using any setting in the range, the quality of the label is not substantially degraded. The quality parameters, as will be discussed in greater detail below, then may be used to narrow this range to maximize quality.

Additionally, the disc label area shape and size may be included. This field might represent the particular size or shape of the disc, as well as the labeling area on the disc, or both. For example, in one embodiment, a specific number or value may be assigned based on the configuration of the disc. Specifically, a number such as the number "1" may be used to identify that the disk has a specific diameter. Likewise, a number "2" may be used to identify that the disk as a particular thickness. By this way, the specific disc configuration may be identified through a series of numerals.

Another field that might be identified during this step is a write/read power ratio. This value could represent the power of the write laser for marking the disc 10 divided by the power of the laser used during a focusing operation or other control of the disc. An additional field that can be read during this step is the default labeling resolution, which identifies a label resolution within a specified power/speed range. Another field includes a laser type which may reflect a laser wavelength such as that used for CDs or DVDs. Additionally, another field may be the media manufacturer. The label writer 12 may be adapted such that it will only write labels for media from particular media manufacturers. Similarly, the marking parameters may include media chemistry, size and shape. The marking parameters may also include the number of times that a label may be generated for a particular media. Also, the marking parameters may include whether the label should be monochrome, grayscale, or color, as well as the label area to be labeled. One skilled in the art will readily recognize modifications or variations and other possible fields that may be read during the step of determining the marking parameters in step 44.

If any one of the marking parameters is not within a specified safety range, then step 56 is executed and the customer is alerted to safety parameters marking violation. Once this occurs, then steps 64, 62, and 66 may be utilized as discussed above to identify and solve the errors in the process. If these steps do not place the settings within the specified range, then the process ends to prevent damage to the disc 10.

In step 46, any remaining reserved fields are reviewed to determine whether or not they pass an integrity check. For example, manufacturer-specific data can be validated, and data fields reserved for future use can be verified to have correct (reserved) values. Otherwise, this can indicate data corruption and labeling should not proceed, or the troubleshooting routine outlined above should be executed. If so, in step 58, the customer is alerted to the data integrity error.

Once step 46 is completed, then step 48 is executed. Step 48 identifies whether or not the quality parameters encoded in the media identification control features 17 are recognized by the host label imaging system. The quality parameters are settings used by the label writer 12 to tune the image processing of the label to obtain optimal marking data for label rendering. These settings may include those listed in the previous sections with regard to the marking parameters. They may also include, for example, settings as to which labeling algorithms should be used to label the disc 10, as well as settings that tune the corresponding data according to the media undercoat and coating chemistry formulations of the disc 10. For monochrome color sets applied to the label, for example, the optical density of marks produced on the label will vary according to the media coating chemistry formulation, and this will impact the tone reproduction of label images. For multicolor sets, the marked shapes and dye reflectance spectra will impact both the tone reproduction and the color gamut of the rendered labels. Reflectance spectra are measurements of luminous power over a range of frequencies. The human visual system samples the spectra using the red, green, and blue cones in the eye to detect color differences between the dyes, and combined with the rods in the eye provides the sensation of brightness.

In an embodiment, the host label imaging system can also use the labeling algorithms and data to show and present label previews to a user on the screen of his computer before printing. This can assist in modeling and adjusting for the image effects of the undercoat and coding formulation to achieve perceptually accurate tone and color reproduction in label images.

If the quality parameters are not properly read, then steps 60 and 80 are executed and the customer is asked whether they would like to prepare a label according to default parameters. Since the quality parameters are optimizations for generating the best possible label, default parameters may be used to generate the label if the quality parameters cannot be read. The default parameters are parameters that fall within the marking parameter range, described previously which, although they may not generate the best possible label, will not cause damage to the media. If the user chooses not to use the default quality parameters, once again, steps 62, 64 and 66 may be executed in an attempt to identify the errors or abort the process. If the user chooses to label using the default parameters, then step 82 is executed to record (log) that default quality parameters were used to generate the label, and step 84 is executed to generate the label on the media using generic (default) labeling parameters.

In step 50, usage statistics can be collected and displayed by the labeling software, which may be effected by a print gauge that records (logs) the number of labels rendered by the label writer 12. Once step 50 is complete, then step 52 is executed and the disc 10 is labeled using the optimized quality parameters.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

The invention claimed is:

1. A method for forming a label on a media, comprising:
    reading media identification control features on the media;
    applying settings to a label writer based on the media identification control features;
    determining whether the label should be generated by the label writer on the media based on the settings identified from the media identification control features; and
    generating the label on the media if it is determined that the label should be generated in the determining step,
    wherein the determining step includes reviewing media parameters in the media identification control features to determine whether or not the label writer recognizes the media identification control features of the media; and
    the label is not generated if the media parameters of the label writer do not match the media parameters of the media.

2. The method according to claim 1, wherein the media is an optical disc and the label is generated with a laser.

3. The method according to claim 1, wherein the media parameters include a version of software to be used by the label writer to generate the label.

4. The method according to claim 1, wherein a troubleshooting routine is executed if the label writer does not recognize the media parameters.

5. The method according to claim 4, wherein the troubleshooting routine includes alerting a customer of a read error.

6. The method according to claim 4, wherein the troubleshooting routine includes prompting a user to reinsert the media, replace the media, update a driver or print engine, or order a new media.

7. The method according to claim 1, wherein:
the settings in the determining step are determined from marking parameters in the media identification control features;
the determining step includes reviewing the marking parameters to determine whether or not the marking parameters are within a predetermined safety range; and
the determining step determines that a label should not be generated if the marking parameters are not within the predetermined safety range.

8. The method according to claim 7, wherein the marking parameters index to a database in the label writer to obtain the settings for generating the label.

9. The method according to claim 7, wherein the marking parameters include a member of the set consisting of: low write laser power and a high write laser power; low write laser speed and a high write laser speed; media label area shape and size; write/read power ratio; and default labeling resolution and laser type.

10. The method according to claim 1, wherein the settings in the applying step are determined from quality parameters that relate to a quality of the label.

11. The method according to claim 10, wherein the quality parameters enable the label writer to generate a visually optimal label.

12. The method according to claim 10, wherein the quality parameters index to a database in the label writer to obtain the quality parameters.

13. The method according to claim 10, wherein the quality parameters include a member of the set consisting of: a low write laser power and a high write laser power; low write laser speed and a high write laser speed; media label area shape and size; write/read power ratio; default labeling resolution and laser type; settings as to which labeling algorithms should be used to label the disc; and settings that tune data according to the media undercoat and coating chemistry formulations of the disc.

14. The method according to claim 10, further comprising:
determining whether the quality parameters relating to the quality of the label can be determined from the media identification control features;
generating the label with default settings if the quality parameters cannot be determined from the media identification control features; and
generating the label with the quality parameters if the quality parameters can be determined from the media identification control features.

15. The method according to claim 1, wherein the media is an optical disc.

16. The method according to claim 15, wherein the disc is a CD or DVD.

17. A medium labeling system for generating a label on a medium, comprising:
a label writer having a laser mechanism configured to read information from the medium and write information on the medium and wherein the label writer is configured to read medium identification control features from the medium to determine settings for generating the label on the medium in accordance with the settings,
wherein the medium identification control features include a version of software to be used by the label writer to generate the label.

18. The medium labeling system according to claim 17, wherein the laser mechanism comprises:
a first laser configured to transmit light against the medium;
a second laser configured to transmit light against the medium; and
a photodetector configured to receive reflected light from the medium generated by the first laser or the second laser.

19. The medium labeling system according to claim 17, wherein the laser mechanism comprises: a laser configured to transmit light against the medium; and a photodetector configured to receive reflected light from the medium generated by the laser.

20. The method according to claim 17, wherein the medium is an optical disc and the label is formed with a laser.

21. The medium labeling system according to claim 20, wherein the disc is a CD or DVD.

22. The medium labeling system according to claim 17, wherein: the settings include medium parameters; the label writer is configured to review the medium parameters to determine whether or not the label writer contains medium parameters that match the medium parameters of the medium; and the label writer is configured to not generate the label if the medium parameters of the label writer do not match the medium parameters of the medium.

23. The medium labeling system according to claim 22, wherein: the settings are determined based on marking parameters in the medium identification control features; the label writer includes a database that contains settings for the label writer; and the marking parameters index to the database to obtain the settings.

24. The medium labeling system according to claim 23, wherein the marking parameters include a member of the set consisting of a low write laser power and a high write laser power, low write laser speed and a high write laser speed, medium label area shape and size, write/read power ratio, default labeling resolution and laser type.

25. The medium labeling system according to claim 17, wherein the label writer includes a troubleshooting routine, wherein the troubleshooting routine is executed if the medium parameters of the label writer do not match the medium parameters of the medium.

26. The medium labeling system according to claim 25, wherein the troubleshooting routine is configured to prompt a user to reinsert the medium, replace the medium, update a driver or print engine, or order new medium if the medium parameters of the medium do not match the medium parameters of the label writer.

27. The medium labeling system according to claim 17, wherein the settings include quality parameters that relate to a quality of the label.

28. The medium labeling system according to claim 27, wherein the quality parameters include settings for the label writer that optimize a quality of the label.

29. The medium labeling system according to claim 27, wherein the quality parameters include a low write laser power and a high write laser power, low write laser speed and a high write laser speed, medium label area shape and size, write/read power ratio, default labeling resolution and laser type.

30. A medium for recording information, the medium comprising:
a labeling material; and
medium identification control features having encoded information relating to settings for a label writer configured to generate a label in the labeling material, wherein the settings include information for determining whether or not the marking parameters are within a predetermined safety range.

31. The medium according to claim 30, wherein the medium is an optical disc.

32. The medium according to claim 31, wherein the disc is a CD or DVD.

33. The medium according to claim 30, wherein: the settings include marking parameters; and the marking parameters include information for the label writer to optimally generating the label.

34. The medium according to claim 33, wherein the marking parameters index to a database in the label writer to obtain the marking parameters.

35. The medium according to claim 34, wherein the marking parameters include at least one of a low write laser speed and a high write laser speed.

36. The medium according to claim 34, wherein the marking parameters include at least one of a medium label area shape and size.

37. The medium according to claim 34, wherein the settings include at least one quality parameter that relates to a quality of the label.

38. The medium according to claim 37, wherein the at least one quality parameter enables the label writer to generate the label in a visually optimally manner.

39. The medium according to claim 37, wherein the quality parameters include a low write laser power and a high write laser power.

40. The medium according to claim 37, wherein the quality parameters include a low write laser speed and a high write laser speed.

41. The medium according to claim 37, wherein the quality parameters include a medium label area shape and size.

42. The medium according to claim 37, wherein the quality parameters include a write/read power ratio.

43. The medium according to claim 37, wherein the quality parameters include a default labeling resolution and a laser type.

44. The medium according to claim 33, wherein the marking parameters include at least one of a low write laser power and a high write laser power.

45. The medium according to claim 33, wherein the marking parameters include a write/read power ratio.

46. The medium according to claim 33, wherein the marking parameters include at least one of a default labeling resolution and a laser type.

47. The medium according to claim 30, further comprising a data side for recording data wherein the medium identification control features are on the label side.

48. The medium according to claim 30, further comprising a data side for recording data wherein the medium identification control features are on the data side.

49. A computer-readable storage medium containing a set of instructions for a label writer, the set of instructions comprising:
  a reading routine configured to instruct the label writer to read media identification control features from an optical disc;
  an applying routine configured to apply settings to a label writer based on the media identification control features;
  a determining routine that determines whether a label should be generated by a label writer on the optical disc based on settings identified from the media identification control features; and
  a generating routine configured to instruct the label writer to generate a label on the optical disc based on the settings applied in the applying routine,
  wherein the generating routine is configured to inhibit the label writer from generating the label on the media if it is determined that the label should not be generated,
  wherein the determining routine is configured to review media parameters in the media identification control features to determine whether the label writer contains media parameters that match the media parameters of the media; and the generating routine is configured to inhibit the label writer from generating the label if the media parameters of the label writer do not match the media parameters of the optical disc
  wherein the media parameters specify a version of software to be used by the label writer to generate the label.

50. The computer-readable storage medium according to claim 49 further comprising a troubleshooting routine that is executed if the media parameters of the label writer do not match the media parameters of the optical disc.

* * * * *

UNITED STATES PATENT AND TRADEMARK OFFICE
CERTIFICATE OF CORRECTION

| | | |
|---|---|---|
| PATENT NO. | : 7,567,266 B2 | Page 1 of 1 |
| APPLICATION NO. | : 10/836866 | |
| DATED | : July 28, 2009 | |
| INVENTOR(S) | : Jeffrey M Valley et al. | |

It is certified that error appears in the above-identified patent and that said Letters Patent is hereby corrected as shown below:

On the face page, in field (56), under "FOREIGN PATENT DOCUMENTS", in column 2, line 4, delete "0416227" and insert -- 04162217 --, therefor.

Signed and Sealed this

Twenty-second Day of June, 2010

David J. Kappos
*Director of the United States Patent and Trademark Office*